(12) United States Patent
Meixel et al.

(10) Patent No.: US 8,830,531 B2
(45) Date of Patent: Sep. 9, 2014

(54) INTELLIGENT HALFTONE MECHANISM

(75) Inventors: John Meixel, Longmont, CO (US);
Timothy Towns, Longmont, CO (US);
Miki Ushijima, Longmont, CO (US);
Mikel Stanich, Longmont, CO (US)

(73) Assignee: InfoPrint Solutions Company LLC, Boulder, CO (US)

( * ) Notice: Subject to any disclaimer, the term of this patent is extended or adjusted under 35 U.S.C. 154(b) by 431 days.

(21) Appl. No.: 13/162,871

(22) Filed: Jun. 17, 2011

(65) Prior Publication Data

US 2012/0320426 A1 Dec. 20, 2012

(51) Int. Cl.
*H04N 1/405* (2006.01)
*G06K 15/00* (2006.01)

(52) U.S. Cl.
CPC .................... *H04N 1/405* (2013.01)
USPC ......................................... 358/3.06

(58) Field of Classification Search
USPC ................................ 358/3.06, 1.9
See application file for complete search history.

(56) References Cited

U.S. PATENT DOCUMENTS

| | | | |
|---|---|---|---|
| 6,275,304 B1* | 8/2001 | Eschbach et al. | 358/1.9 |
| 7,039,876 B2 | 5/2006 | Lavendel | |
| 7,602,531 B2 | 10/2009 | Bailey | |
| 7,616,349 B2 | 11/2009 | Vittitoe | |
| 2005/0195443 A1 | 9/2005 | Saneto | |
| 2006/0077468 A1 | 4/2006 | Loce et al. | |
| 2006/0109513 A1* | 5/2006 | Lee | 358/3.06 |

* cited by examiner

*Primary Examiner* — Mark Zimmerman
*Assistant Examiner* — Michael Burleson
(74) *Attorney, Agent, or Firm* — Blakely, Sokoloff, Taylor & Zafman LLP

(57) ABSTRACT

A printing system is disclosed. The printing system includes an image processor to selectively rasterize a plurality of objects, and to determine if a size of a first object is less than or equal to a predetermined threshold perform a single-cell halftone process on the first object if the size of the first object is less than or equal to the predetermined threshold and perform a super-cell halftone process on the first object if the size of the first object is greater than the predetermined threshold.

20 Claims, 4 Drawing Sheets

INTELLIGENT HALFTONE MECHANISM

FIELD OF THE INVENTION

The invention relates to the field of image reproduction, and in particular, to digital halftoning.

BACKGROUND

Halftoning is a process by which continuous-tone images are approximated by a pattern of pixels that can achieve only a limited number of discrete intensities. An example of this is the rendering of gray tones with black and white pixels, such as in a newspaper photograph. A halftone pattern is made up of a region of pixels referred to as a halftone cell. In conventional digital halftoning (e.g., halftoning that uses rational tangent angles), a halftone cell includes a specific, repeatable pattern. The tonal range of a halftone pattern depends upon the number of pixels in the halftone cell.

A halftone cell may cover only a small number of values (e.g., 16 values for a 4×4 cell). However, it may be necessary to include a higher range of values (e.g., 256). Thus, the halftone cell may be converted to a super-cell by replicating the original cell to create a larger cell having more gray levels. The larger cell includes multiple screen dots where each dot is slightly different which increases the number of gray levels beyond the number for a single cell. Since super-cell halftones can provide up to 256 gray values, for systems which have bit depth of eight, they are usually implemented as a default for all objects that are to be printed.

Although super-cell halftones are exceptional for providing a large number of gray levels, they do not provide as much sharpness for rendering fine details as single-cell halftones. Therefore, printer users must typically sacrifice print quality in certain portions of a page in order to achieve a higher number of gray levels, or sacrifice the number of gray levels in other portions of a page to achieve fine details, since printers have only the capability of processing a page of print data using either single-cell or super-cell halftones.

Accordingly, a mechanism to automatically select between multiple halftones during rendering of a page is desired.

SUMMARY

In one embodiment, a printing system is disclosed. The printing system includes a processor to rasterize a plurality of objects, and to determine if a size of a first object is less than or equal to a predetermined threshold perform a single-cell halftone process on the first object if the size of the first object is less than or equal to the predetermined threshold and perform a super-cell halftone process on the first object if the size of the first object is greater than the predetermined threshold.

BRIEF DESCRIPTION OF THE DRAWINGS

A better understanding of the present invention can be obtained from the following detailed description in conjunction with the following drawings, in which.

DETAILED DESCRIPTION

An intelligent halftone processing mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
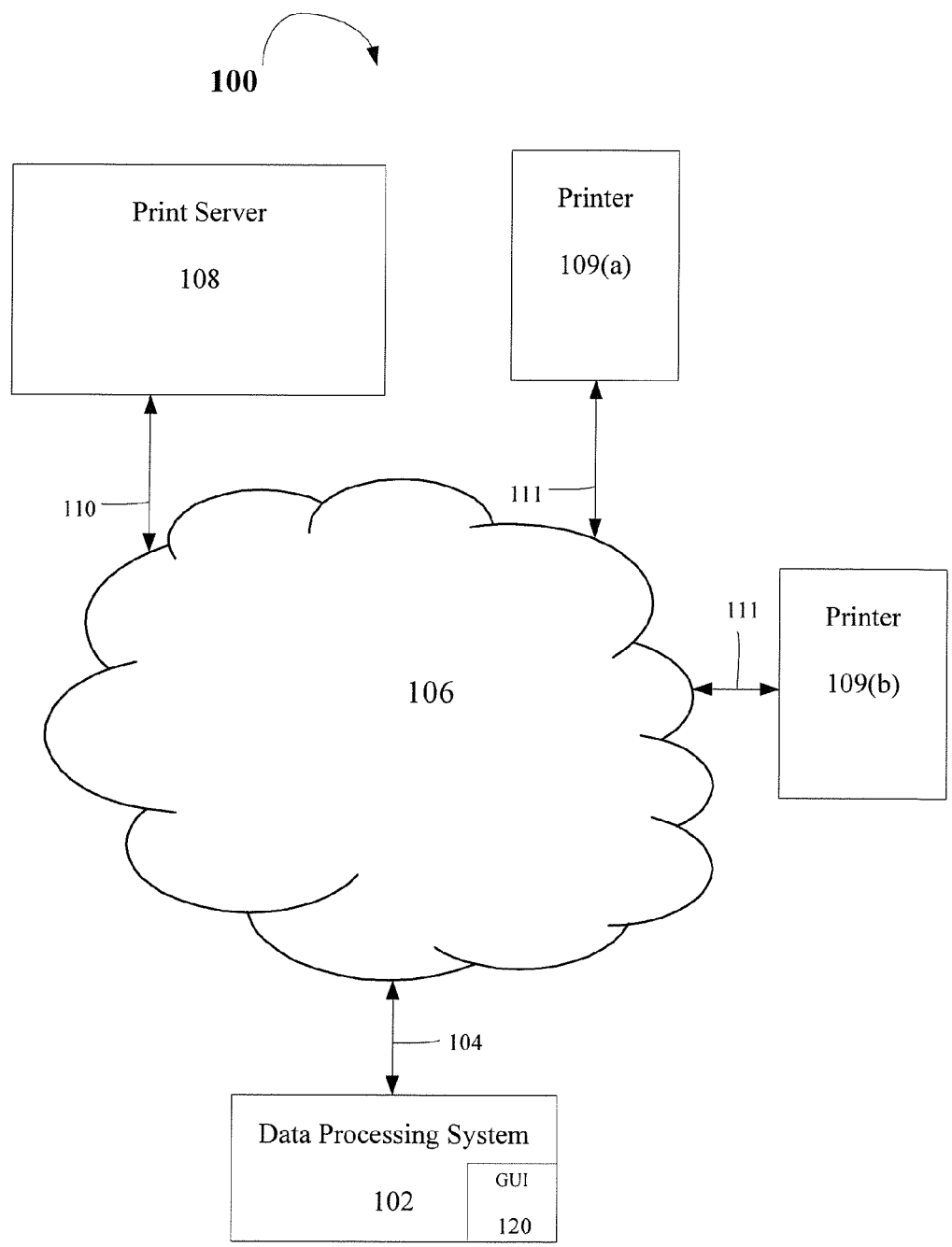
FIG. 1 illustrates one embodiment of a data processing system network.

FIG. 1 illustrates one embodiment of a data processing system network 100. Network 100 includes a data processing system 102, which may be either a desktop or a mobile data processing system, coupled via communications link 104 to network 106. In one embodiment, data processing system 102 is a conventional data processing system including a processor, local memory, nonvolatile storage, and input/output devices such as a keyboard, mouse, trackball, and the like, all in accordance with the known art. In one embodiment, data processing system 102 includes and employs the Windows operating system, or other operating system, and/or network drivers permitting data processing system 102 to communicate with network 106 for the purposes of employing resources within network 106.

Network 106 may be a local area network (LAN) or any other network over which print requests may be submitted to a remote printer or print server. Communications link 104 may be in the form of a network adapter, docking station, or the like, and supports communications between data processing system 102 and network 106 employing a network communications protocol such as Ethernet, the AS/400 Network, or the like.

According to one embodiment, network 106 includes a print server 108 that serves print requests over network 106 received via communications link 110 between print server 108 and network 106. Print server 108 subsequently transmits the print requests via communications link 110 to printer 109 for printing, which are coupled to network 106 via communications links 111. In one embodiment, printer 109 receives Intelligent Printer Data Stream (IPDS) data streams from print server 108 via communication link 111.

Although described as separate entities, other embodiments may include print server 108 being incorporated in one or more of the printers 109. However in other embodiments, the print server and printer may be physically separate entities. Therefore, the data processing system network 100 depicted in FIG. 1 is selected for the purposes of explaining and illustrating the present invention and is not intended to imply architectural limitations. Those skilled in the art will recognize that various additional components may be utilized in conjunction with the present invention.

Figure 2:
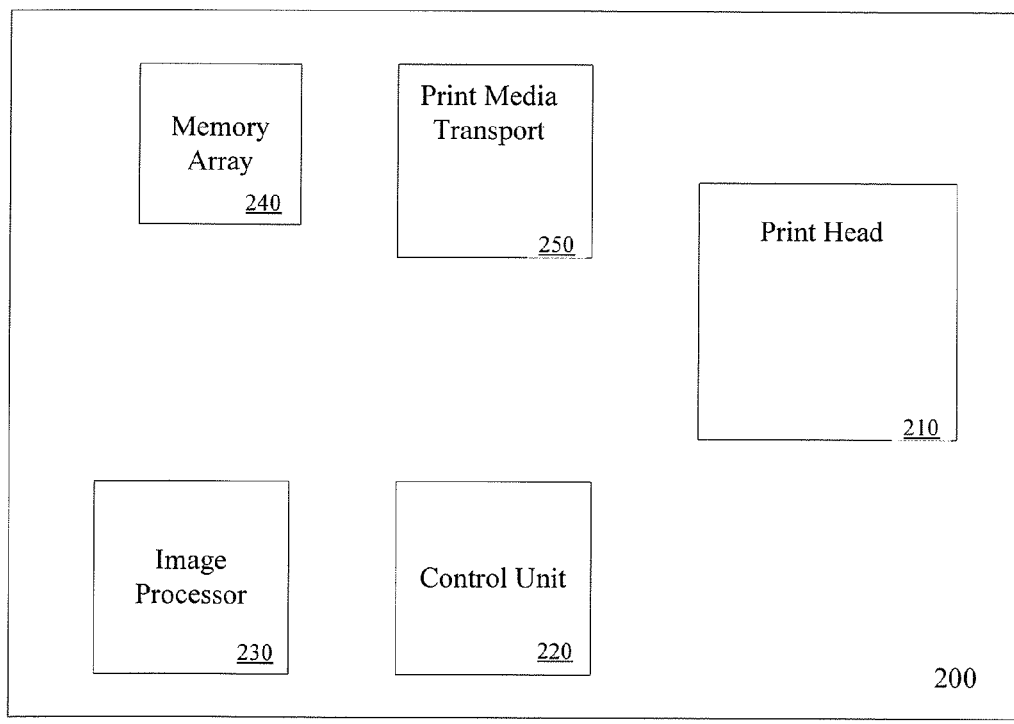
FIG. 2 illustrates one embodiment of a printer.

FIG. 2 illustrates one embodiment of a printer 200. In one embodiment, printer 200 is implemented as the printer 109. Printer 200 includes a print head 210, control unit 220, image processor 230, memory array 240 and print media transport 250. Print head 210 includes a printing element that prints to a print medium. In one embodiment, print head 210 is a LASER Printhead that is implemented to write image data onto a drum. The image data is developed and transferred onto a web of paper as the final step to execute a print job.

Control unit 220 controls the operation of print head 210, while image processor 230 performs rasterization of image data received at printer 200. Rasterization converts information received at printer 200 into a raster format. Particularly, image processor 230 generates a raster scan of a received image that is to be stored as scan line data in memory array 240. Subsequently, image processor 230 performs halftone processing of the scan line data stored in memory array 240.

According to one embodiment, image processor 230 has the capability of performing conventional (e.g., single-cell) and super-cell halftoning processes. Single-cell halftoning creates a single screen dot, which limits the number of screen dot sizes for adjacent gray levels, such that the number of gray levels (N) equals 1+single-cell area (e.g., assuming a 45 degree binary halftone (printer dot per inch (DPI)/screen frequency (LPI))$^2$).

Figure 3A:
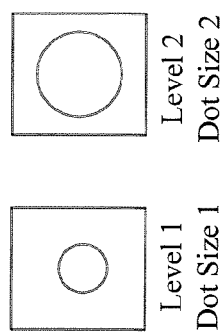
FIGS. 3A and 3B illustrates one embodiment of halftone gray levels.
Figure 3B:
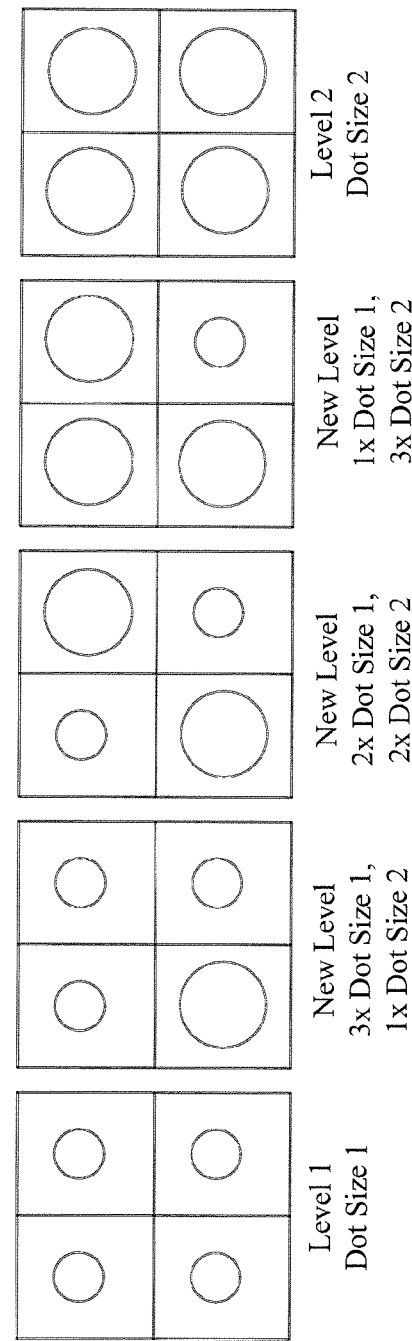

For example, FIG. 3A shows the screen dots for two adjacent gray levels for a single-cell. As shown in FIG. 3A, a first gray level (Level 1) has a first dot size (Dot Size 1), while the adjacent gray level (Level 2) has a second dot size (Dot Size 2). Applying this principle to an entire halftone design super-cell halftoning increases the number of gray levels so that N=(1+number of single-cells*single-cell area). Thus, by combining Dot Size 1 and Dot Size 2 in a case where the single cell is replicated into a 2×2 array, super-cell halftoning generates three new gray levels for a total of five, as shown in FIG. 3B. For example, one of the new gray levels uses three Dot Size 1 and one Dot Size 2.

However as described above, super-cell halftoning may lead to reduced print quality in some cases when rendering text, for example in small point text that is rendered in gray by super-cell halftoning. This reduced print quality is due to cases which render text into the new gray levels, as illustrated in FIG. 3B, will have more edge artifacts due to the variability in screen dots. Similarly, fine detail may be perceived as missing in small images due to the screen dot variability.

According to one embodiment, image processor 230 performs an intelligent halftoning process to select between single-cell and super-cell halftoning for each object being rendered. In such an embodiment, super-cell halftoning is performed for objects greater than or equal to a predetermined threshold. In a further embodiment, threshold parameters are provided to printer 109 by an operator via a graphical user interface (GUI) 120.

In one embodiment, the operator may select (or change) a Text Halftone Threshold that specifies a threshold text point size at and below which a single-cell halftone process will be performed to provide optimum print quality. In one embodiment, the Text Halftone Threshold is specified in points (e.g., 1/72nd of an inch). A super-cell halftone process is performed for larger point size text to enable more gray levels to be generated, since the print quality degradation is less perceptible.

The operator may also select an Image Halftone Threshold that specifies a threshold image dimension (width or height) dimension at and below which a single-cell halftone process will be used to render the image, where the threshold dimension is equal to the length of the shorter dimension. In one embodiment, the Image Halftone Threshold is a single dimension specified in inches or millimeters. Image objects larger than the Image Halftone Threshold are rendered using the super-cell halftone process since larger images may need more gray shades at the expense of detail.

Figure 4:
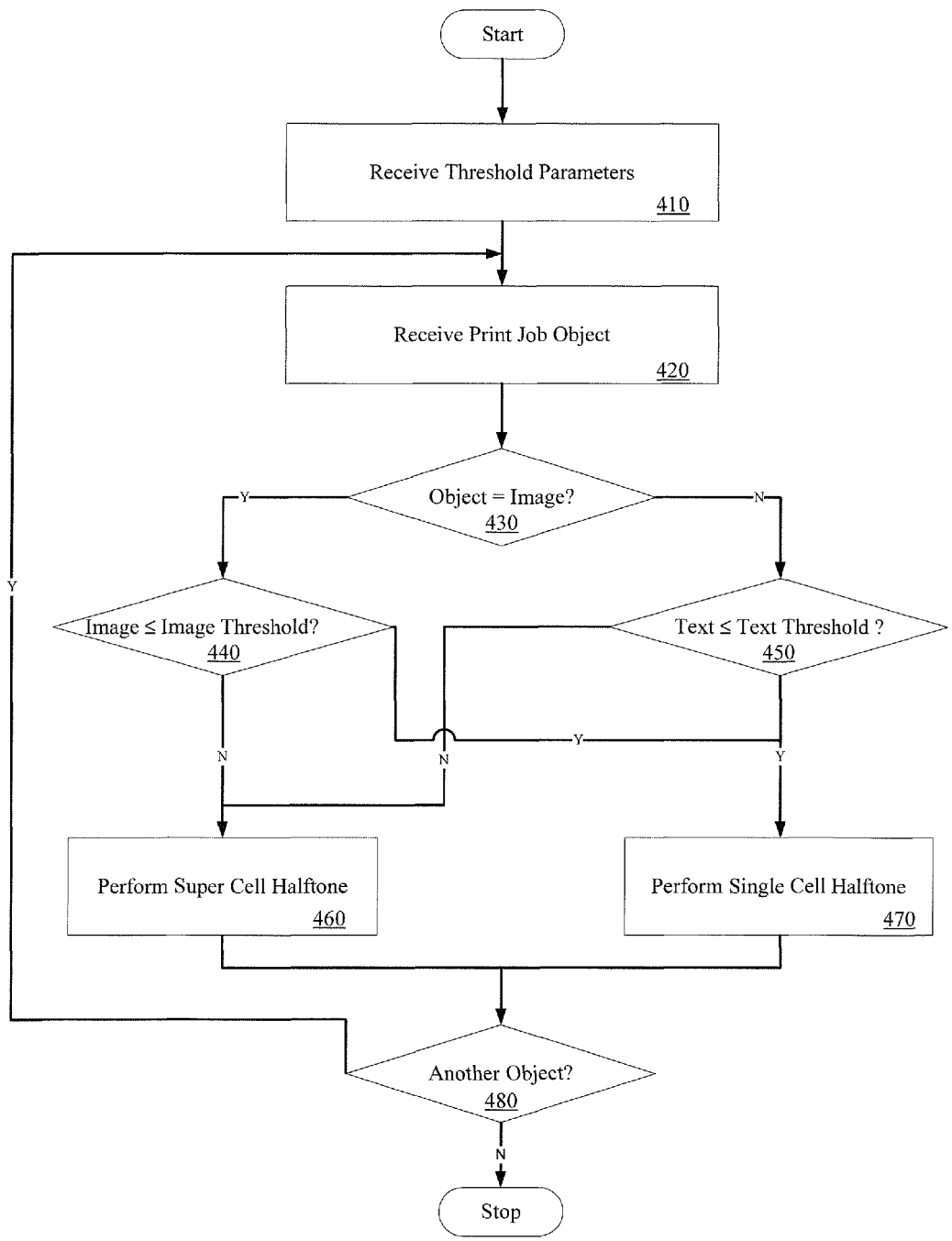
FIG. 4 is a flow diagram illustrating one embodiment of a halftone process.

FIG. 4 is a flow diagram illustrating one embodiment of a halftone process. At processing block 410, receiving threshold parameters (Text Halftone Threshold and Image Halftone Threshold) at printer 109 via GUI 120. At processing block 420, a rasterized print job object is received that is to be rendered as a component of page data. At decision block 430, it is determined whether the object is an image.

If the object is an image, it is determined whether the minimum size of the image is less than or equal to Image Halftone Threshold, decision block 440. If the minimum size of the image is greater than Image Halftone Threshold, the super-cell halftone process is performed on the image, processing block 460. If the size of the image is less than or equal to Image Halftone Threshold, the single-cell halftone process is performed on the image, processing block 470. Subsequently, it is determined whether another object for the page is to be rendered, decision block 480. If so control is returned to processing block 420 where another rasterized object is received. Otherwise, the process is completed. In other embodiments, the user may also decide to override the intelligent halftoning process and select rendering that uses only single cell or supercell screening.

If at decision block 430 it is determined that the object is text, it is determined whether the size of the text is less than or equal to Text Halftone Threshold, decision block 450. If the size of the text is greater than Text Halftone Threshold, the super-cell halftone process is performed at processing block 460. If the size of the text is less than or equal to Text Halftone Threshold, control is returned to processing block 470 where the single-cell halftone process is performed on the text. Again a determination is made as to whether another object for a page is to be rendered, decision block 480.

The above-described halftone mechanism enhances print quality by giving the printer the ability to select different halftones for different objects of a page.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A method comprising:
receiving a plurality of print job objects;
determining if a size of a first print job object is less than or equal to a predetermined threshold;

performing a single-cell halftone process on the first object if the size of the first object is less than or equal to the predetermined threshold; and performing a super-cell halftone process on the first object if the size of the first object is greater than the predetermined threshold.

2. The method of claim 1 further comprising determining if the first object is an image object.

3. The method of claim 2 wherein determining if the size of the first object is less than or equal to a predetermined threshold comprises determining if the first object is less than or equal to an image halftone threshold value if the first object is an image object.

4. The method of claim 2 wherein determining if the size of the first object is less than or equal to a predetermined threshold comprises determining if the first object is less than or equal to a text halftone threshold value if the first object is not an image object.

5. The method of claim 1 further comprising receiving one or more threshold values prior to receiving the plurality of objects.

6. The method of claim 5 wherein the one or more threshold values are received via a graphical user interface (GUI).

7. The method of claim 2 further comprising determining that there are more print job objects to process.

8. The method of claim 7 further comprising:
determining if a size of a second print job object is less than or equal to a predetermined threshold;
performing a single-cell halftone process on the second object if the size of the second object is less than or equal to the predetermined threshold; and
performing a super-cell halftone process on the second object if the size of the first object is greater than the predetermined threshold.

9. A printing system comprising:
an image processor to rasterize a plurality of print job objects, and to determine if a size of a first print job object is less than or equal to a predetermined threshold perform a single-cell halftone process on the first object if the size of the first object is less than or equal to the predetermined threshold and perform a super-cell halftone process on the first object if the size of the first object is greater than the predetermined threshold.

10. The printing system of claim 9 wherein the image processor further determines if the first object is an image object.

11. The printing system of claim 10 wherein determining if the size of the first object is less than or equal to a predetermined threshold comprises determining if the first object is less than or equal to an image halftone threshold value if the first object is an image object.

12. The printing system of claim 10 wherein determining if the size of the first object is less than or equal to a predetermined threshold comprises determining if the first object is less than or equal to a text halftone threshold value if the first object is not an image object.

13. The printing system of claim 9 wherein the image processor further receives one or more threshold values prior to receiving the plurality of objects.

14. The printing system of claim 13 further comprising a graphical user interface (GUI) to receive one or more threshold values.

15. The printing system of claim 10 wherein the image processor further determines if a size of a second print job object is less than or equal to a predetermined threshold, performs a single-cell halftone process on the second object if the size of the second object is less than or equal to the predetermined threshold and performs a super-cell halftone process on the second object if the size of the first object is greater than the predetermined threshold.

16. An article of manufacture comprising a non-transitory machine-readable medium including data that, when accessed by a machine, cause the machine to perform operations comprising:
receiving a plurality of print job objects;
determining if a size of a first print job object is less than or equal to a predetermined threshold;
performing a single-cell halftone process on the first object if the size of the first object is less than or equal to the predetermined threshold; and
performing a super-cell halftone process on the first object if the size of the first object is greater than the predetermined threshold.

17. The article of manufacture of claim 16 wherein determining if the size of the first object is less than or equal to a predetermined threshold comprises determining if the first object is less than or equal to an image halftone threshold value if the first object is an image object.

18. The article of manufacture of claim 16 wherein determining if the size of the first object is less than or equal to a predetermined threshold comprises determining if the first object is less than or equal to a text halftone threshold value if the first object is not an image object.

19. The article of manufacture of claim 16 wherein the machine-accessible medium include data that cause the machine to perform further operations comprising receiving one or more threshold values via a graphical user interface (GUI) prior to receiving the plurality of objects.

20. The article of manufacture of claim 16 wherein the machine-accessible medium includes data that causes the machine to perform further operations comprising:
determining if a size of a second print job object is less than or equal to a predetermined threshold;
performing a single-cell halftone process on the second object if the size of the second object is less than or equal to the predetermined threshold; and
performing a super-cell halftone process on the second object if the size of the first object is greater than the predetermined threshold.

* * * * *